United States Patent [19]

Hirakawa et al.

[11] 4,127,695
[45] Nov. 28, 1978

[54] METHOD OF INSULATING ELECTROMAGNETIC COILS

[75] Inventors: Koichi Hirakawa; Takashi Shibano, both of Kawanishi; Kazuo Masuda, Nara, all of Japan

[73] Assignee: Matsushita Electric Industrial Co., Ltd., Osaka, Japan

[21] Appl. No.: 620,265

[22] Filed: Oct. 7, 1975

[51] Int. Cl.² ............................................. B05D 5/12
[52] U.S. Cl. ............................. 428/371; 174/110 E; 427/116; 427/118; 427/120; 427/386; 428/383; 428/416
[58] Field of Search ............... 427/116, 386, 117, 118, 427/120; 29/602 R, 605, 606; 174/110 E; 428/373, 375, 378, 380, 383, 413, 414, 416, 418, 371

[56] References Cited

U.S. PATENT DOCUMENTS

| | | | |
|---|---|---|---|
| 3,021,234 | 2/1962 | Casement et al. | 427/116 |
| 3,145,127 | 8/1964 | Baun | 427/116 |
| 3,412,354 | 11/1968 | Sattler | 29/605 |
| 3,434,087 | 3/1969 | Hofmann | 174/110 E X |
| 3,436,815 | 4/1969 | Sheets | 29/605 |
| 3,531,321 | 9/1970 | Batzer et al. | 427/116 |
| 3,535,289 | 10/1970 | Kato et al. | 174/110 E X |
| 3,676,814 | 7/1972 | Trunzo et al. | 427/116 |

*Primary Examiner*—George F. Lesmes
*Assistant Examiner*—Bruce H. Hess
*Attorney, Agent, or Firm*—Burgess, Ryan and Wayne

[57] ABSTRACT

There is provided a method of insulating electromagnetic coils comprising coating an electromagnetic coil with epoxy resin containing a cross linking agent consisting essentially of an acid anhydride, said coil having a bonding layer consisting of epoxy resin having a melting point of higher than 60° C, and then subjecting to bridging said epoxy resin containing a cross linking agent by heating.

13 Claims, 3 Drawing Figures

METHOD OF INSULATING ELECTROMAGNETIC COILS

BACKGROUND OF THE INVENTION

Electromagnetic coils of electrical machinery and apparatus such as transformers are made of covered wires. The covered wires are prepared by coating copper or aluminum wires with insulating resins such as polyimides, polyesters, polyesterimides, polyurethanes, epoxy resins, nylon resins and the like. In order to improve the dielectric strength and the heat resistance of the electromagnetic coils, the coils are coated with epoxy resins, polyester resins or acrylic resins. Such coating is effected by sticking powders of the resin to the heated coils and then fixing the resin to the coils. Alternatively, said coating is effected by allowing to adhere electrostatically charged powders to the coils and then fixed the resin to the coil by fusing the resins.

On referring to the accompanying drawings, FIG. 1 shows a cross section of a coil coated with powdered resin. The numbers of 1, 2, 3 . . . 20 represent covered wires and the order of windings of the wires. The coil is coated with an insulating layer 21 of resin, which is fixed to a surface of the coil. In this coil, voids 22 are formed. Owing to the voids, the insulating layer of coating deteriorates by repeated use of the electrical apparatus, and the dielectric strength thereof deteriorates.

As high voltages are generated in the windings 1, 10, 11, 20 and 5, 6, 15, 16, a high dielectric strength of the coil is required. In the coil coated by the conventional method as stated above, discharge is apt to occur on the windings on account of the voids.

It is an object of the present invention to provide a method of insulating electromagnetic coils by which the coils having high dielectric strength and heat resistance can be obtained.

SUMMARY OF THE INVENTION

The present invention relates to a method of insulating electromagnetic coils of electrical machinery and apparatus, and more particularly to a method of insulating electromagnetic coils by which high dielectric strength and heat resistance of the coils can be obtained, said coils having been made of a covered wire coated with conventional insulating resins.

The method of the present invention can be summarized as follows:

(1) An electromagnetic coil is made by winding a self-bonding wire and bonding the windings to each other, said self-bonding wire having been prepared by forming a bonding layer consisting of an epoxy resin having a melting point of higher than 60° C. on a covered wire coated with a conventional insulating resin. The electromagnetic coil thus made is covered with powdered epoxy resin containing a cross linking agent consisting essentially of an acid anhydride and then heated at a temperature of 150° C. to 250° C. for 3 hours to 30 minutes to bridge the epoxy resin. In this way, the coil is coated with an insulating layer of the bridged epoxy resin.

An alternative method is as follows:

(2) An electromagnetic coil is made of a covered wire coated with conventional insulating resin. The coil is coated with a bonding layer consisting of epoxy resin having a melting point of higher than 60° C. and covered with powdered epoxy resin containing a cross linking agent consisting essentially of acid anhydride, and then heated at a temperature of 150° C. to 250° C. for 3 hours to 30 minutes to bridge the epoxy resin. In this way, the coil is coated with an insulating layer of the bridged epoxy resin.

As stated above, the method of the present invention is characterized in that epoxy resin having a melting point of higher than 60° C. and powdered epoxy resin containing a cross linking agent consisting essentially of an acid anhydride are used and the powdered epoxy resin is subjected to bridging by heating.

By a method of the present invention, high dielectric strength and high heat resistance of an electromagnetic coil can be obtained. In the coil having an insulating layer of epoxy resin of about 0.3mm in thickness, a dielectric strength of 8kV and the heat resistance temperature of 170° C. can be obtained.

FIGS. 2 and 3 show cross sections of coils coated by the method of the present invention as shown in (1) and (2) above, respectively. Voids as presented in FIG. 1 cannot be seen in FIGS. 2 and 3. A bonding layer 23 of epoxy resin having a melting point of higher than 60° C. is formed between covered wires and a layer 21 of epoxy resin containing a cross linking agent.

Epoxy resin used in the present invention is bisphenol A diglycidyl ether (i.e. 2,2-bis(4'-glycidyloxyphenyl)-propane) having the following structural formula:

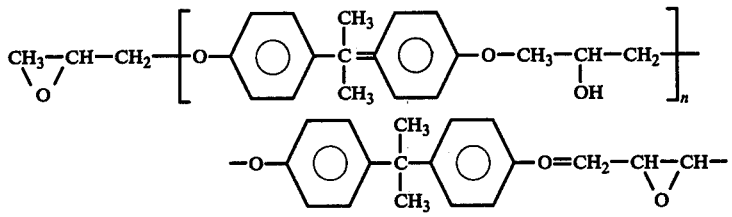

wherein $n$ is zero to 12.

At least one of epoxy resins (1)–(4) listed below may be added to bisphenol A diglycidyl ether.

(1) novolak-type epoxy resin

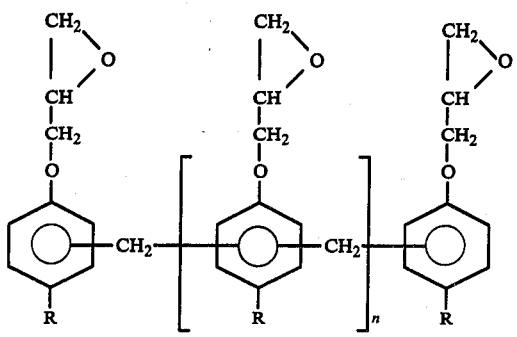

wherein R is hydrogen or an alkyl group of $C_1$ to $C_4$ and $n$ is 1 or 2.

(2) hydantoin-type epoxy resin

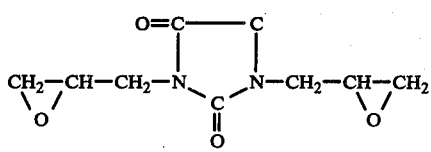

(3) alicyclic epoxy resin

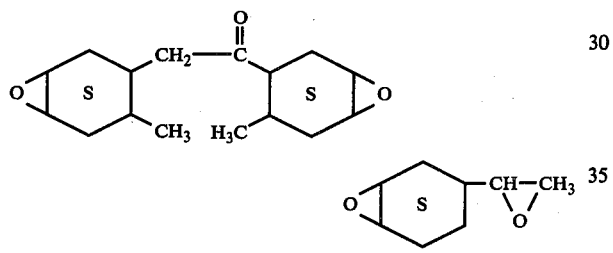

(4) epoxidized oil

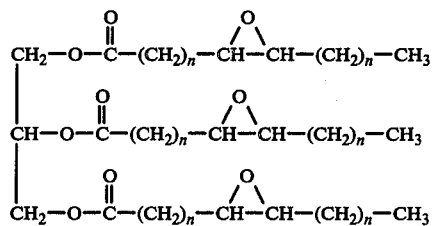

wherein $n$ is 1 to 5.

In the method of the present invention, bisphenol A diglycidyl ether is used as the chief ingredient. Epoxy resin having a melting point of higher than 60° C. is bisphenol A diglycidyl ether having a value of $n$ of higher than 1.5. Such epoxy resin (bisphenol A diglycidyl ether) having $n$ of 1.5 may be obtained, for example, by mixing epoxy resin having $n$ of 1 and epoxy resin having $n$ of 2 in a ratio of 1 to 1. Epoxy resin having the desired value of $n$ may be obtained by mixing epoxy resins having different values of $n$. Accordingly, bisphenol A diglycidyl ether having the desired melting point may be obtained by mixing epoxy resins having different values of $n$. Other epoxy resins listed in (1) to (4) above optionally may be added to bisphenol A diglycidyl ether to obtain an epoxy resin having a melting point of higher than 60° C.

The reasons for using an epoxy resin having a melting point of higher than 60° C. must be used, are as follows:

Epoxy resins having a melting point of lower than 60° C. are soft and sticky at room temperature, and wires coated with such epoxy resins stick to each other in the winding operation of the wires, and further a coil having a layer of such epoxy resin is inferior in heat resistance.

Epoxy resins which are used by mixing with cross linking agents are bisphenol A diglycidyl ether having a value of $n$ of zero to 12. Epoxy resins listed in (1) to (4) above may be added in an amount of 1 to 50 parts by weight based on 100 parts by weight of bisphenol A diglycidyl ether.

Typical acid anhydrides which may be used as a cross linking agent are as follows:

maleic anhydride, phthalic anhydride, succinic anhydride, citraconic anhydride, itaconic anhydride, tricarballylic anhydride, linoleic acid adduct of maleic anhydride, maleic anhydride adduct of methylcyclopentadiene, pyromellitic dianhydride,

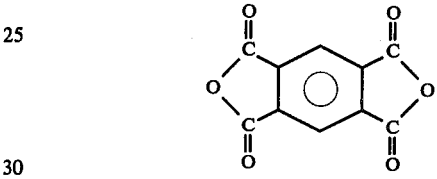

cycropentanetetracarboxylic dianhydride,

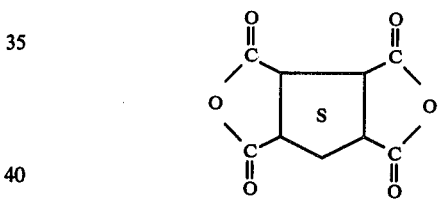

benzophenonetetracarboxylic dianhydride,

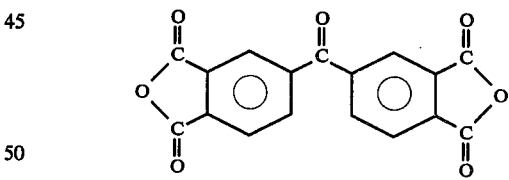

ethylene glycol bistrimellitate

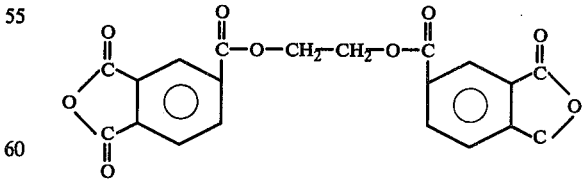

As a cross linking agent, pyromellitic dianhydride may preferably be used. However, acid anhydrides as listed above also may be used alone or in a mixture thereof.

Other cross linking agents as listed below may be added to acid anhydrides:

dicyandiamide, diethylenetriamine, diaminodiphenylsulfone, 2-methylimidazole, 2-ethyl-4-methylimidazole and 1-benzyl-2-methylimidazole.

Cross linking agents are used in an amount of 0.5 to 90 parts by weight based on 100 parts by weight of epoxy resins.

Inorganic matters (i.e. fillers) as listed below may be added to a mixture of epoxy resins and cross linking agents in an amount of 0.5 to 70 parts by weight based on 100 parts by weight of the mixture:

silicon dioxide, titanium oxide, calcium carbonate, magnesium oxide, zirconium silicate, aluminum oxide, aluminum hydroxide, beryllium oxide, chrome dioxide, ferric oxide, clay, talc, mica and glass fiber.

A method of the present invention may be effected as follows:

A wire is coated with epoxy resin having a melting point of higher than 60° C., said wire being a covered wire with polyimide, polyester or polyesterimide. A coil is made of the coated wire. A mixture of 100g of epoxy resins and 5g to 90g of cross linking agents are coated on the coil and then the coil is heated at a temperature of 150° C. to 250° C. to bridge the epoxy resin. In this way, the bridged epoxy resin is fixed to the coil.

An alternative method is as follows:

A coil is made of a covered wire as shown above, and the coil is coated with epoxy resin having a melting point of higher than 60° C. in a thickness of $5\mu$ to $500\mu$. A mixture of epoxy resin and cross linking agent is coated on the coil and then the coil is heated to fix epoxy resin to the coil by repeating the same procedure as described above.

In the above-mentioned method, fillers may be added to the mixture of epoxy resins and cross linking agents, and the epoxy resin is principally bisphenol A diglycidyl ether and the cross linking agent consists essentially of acid anhydride.

A covered wire or a coil may be coated with epoxy resin having a melting point of higher than 60° C. by applying the molten epoxy resin to the wire or coil.

A coil may be coated with a mixture of powdered epoxy resin and powdered cross linking agent or powders of a mixture of epoxy resin and cross linking agent by fluid bed technique or electrostatic fluid bed technique as illustrated below:

Fluid bed technique:

A heated coil is dipped into powders suspended in air. Said powders may be suspended by air blown up through a porous plate. Powders adhere to the coil and the powders are fixed to the coil by cooling.

Electrostatic fluid bed technique:

Electrostatically charged powders at high voltage are attracted to a coil, and the attracted powders are fixed to the coil by heating.

DESCRIPTION OF THE PREFERRED EMBODIMENTS

The following examples are given by way of illustration only and are not intented as limitation of this invention.

EXAMPLE 1

Figure 2:
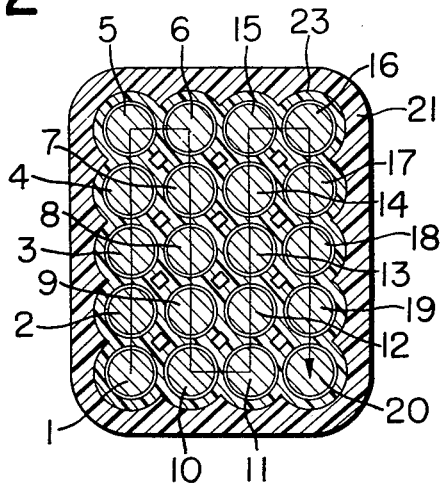

A covered wire (diameter 1mm) coated with polyesterimide was coated with bisphenol A diglycidyl ether (molecular weight 3800; melting point 160° C.) in a thickness of about $40\mu$. A coil having 2000 turns was made of the coated wire. A mixture of 100g of powdered bisphenol A diglycidyl ether (molecular weight 1500; melting point 105° C.), 10g of pyromellitic dianhydride and 100g of silicon dioxide (particle size $10\mu$–$100\mu$) was sticked to the coil heated at a temperature of 205° C. by fluid bed technique. A thickness of layer of the powders was 0.3mm. The coil having the powders sticked was heated at a temperature of 200° C. for 30 minutes to form an insulating layer on a surface of the coil. A coil having an insulating layer as shown in FIG. 2 was obtained.

The dielectric breakdown voltage of the insulating layer was 8kV and the heat resistance temperature thereof was 170° C.

Figure 1:
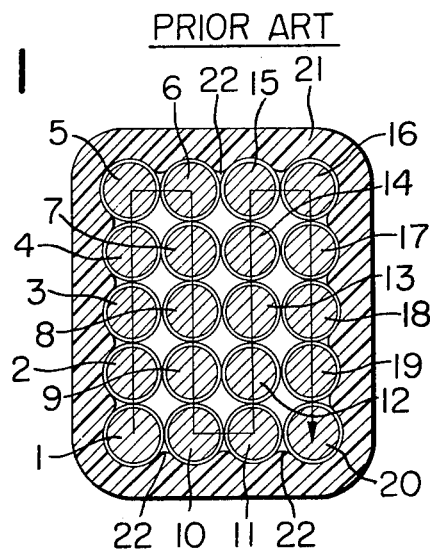

Comparison tests were carried out as follows:
(1) An insulating layer was formed on a surface of a coil by repeating the same procedure as described above except that a covered wire coated with polyesterimide was not coated with bisphenol A diglycidyl ether (m.w. 3800; m.p. 160° C.). A coil having an insulating layer as shown in FIG. 1 was obtained. The dielectric breakdown voltage of the insulating layer thus obtained was 6kV and the heat resistance temperature thereof was 140° C.
(2) An insulating layer was formed on a surface of a coil by repeating the same procedure as described above except that dicyandiamide, diethylenetriamine or diaminodiphenylsuefone was used instead of pyromellitic dianhydride as a cross linking agent. The dielectric breakdown voltage of the insulating layer was 6kV and the heat resistance temperature thereof was 130° C.

EXAMPLE 2

Figure 3:
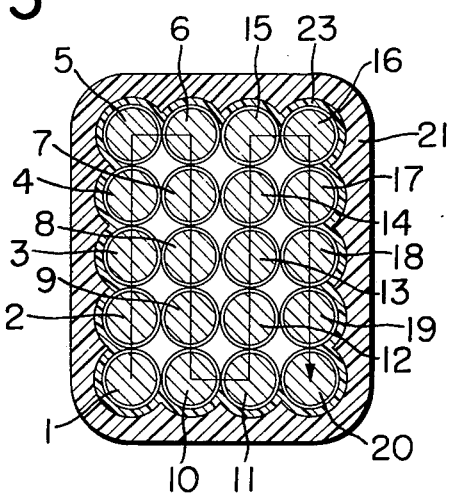

A coil having 2,000 turns was made of a covered wire (diameter 1mm) coated with polyesterimide. The coil was coated with bisphenol A diglycidyl ether (molecular weight 3800; melting point 160° C.) in a thickness of about $40\mu$. A mixture of bisphenol A diglycidyl ether, pyromellitic dianhydride and silicon dioxide as used in Example 1 was sticked to the coil and an insulating layer was formed on a surface of the coil by repeating the same procedure as described in Example 1. A coil having an insulating layer as shown in FIG. 3 was obtained.

The dielectric breakdown voltage of the insulating layer was 8kV and the heat resistance temperature thereof was 170° C.

EXAMPLE 3

An insulating layer was formed on a surface of a coil by repeating the same procedure as described in Example 1 except that 1 to 20% of bisphenol A diglycidyl ether (m.w. 1500; m.p. 105° C.) was substituted by novolak-type epoxy resin, hydantoin-type epoxy resin, alicyclic epoxy resin or epoxidized oil. The dielectric breakdown voltage of the insulating layer was 8kV and the heat resistance temperature thereof was 170° C. The same results as those in Example 1 was obtained.

EXAMPLE 4

An insulating layer was formed on a surface of a coil by repeating the same procedure as described in Example 1 except that cyclopentanetetracarboxylic dianhydride, benzophenonetetracarboxylic dianhydride, ethylene glycol bistrimellitate or other acid anhydride such as maleic anhydride was used instead of pyromellitic dianhydride as a cross linking agent. The insulating layer thus formed showed the results similar to those in Example 1.

The formation of voids among covered wires by which a coil is made, can be prevented and therefore the dielectric strength and the heat resistance of the coil can be improved by coating the covered wires with epoxy resin having a melting point of higher than 60° C. and forming an insulating layer on a surface of the coil. The insulating layer may be formed by sticking powders on a surface of the coil and heating it, said powders having been prepared by pulverizing a solid obtained by melting a mixture of epoxy resins and acid anhydrides as a cross linking agent.

A method of the present invention as illustrated above is preferably used for insulating magnetic coils of transformers or leakage transformers. The leakage transformer has a leakage core between a high-tension coil and a low-tension coil, and partial discharge is apt to occur between the leakage core and the high-tension coil. Such partial discharge can effectively be prevented by insulating the high-tension coil according to a method of the present invention. Further, the dielectric strength and the heat resistance of the low-tension coil can be improved by insulating the low-tension coil according to a method of the present invention.

We claim:

1. A method of forming an insulated electromagnetic coil which comprises forming an electromagnetic coil having a bonding layer of an epoxy resin having a melting point higher than 60° C. and consisting essentially of bisphenol A diglycidyl ether of the formula

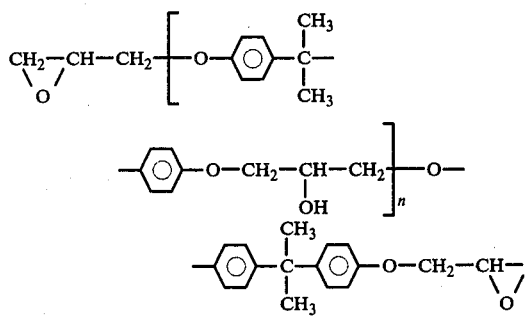

wherein $n$ has a value higher than 1.5 and coating said coil with an epoxy resin consisting of bisphenol A diglycidyl ether of the formula

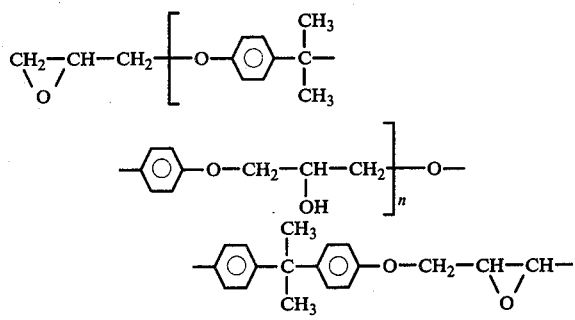

wherein $n$ is from zero to 12 and a cross-linking agent consisting of acid anhydrides and heating said coated coil at a temperature of 150°–250° C. whereby the epoxy resin containing the cross linking agent is cross linked and bridges the coil.

2. The method of claim 1, wherein said epoxy resin having a melting point higher than 60° C. further includes from 1 to 50 parts by weight based on 100 parts by weight of bisphenol A diglycidyl ether of at least one epoxy resin selected from the group consisting of:

(1) a novolak-type epoxy resin of the formula

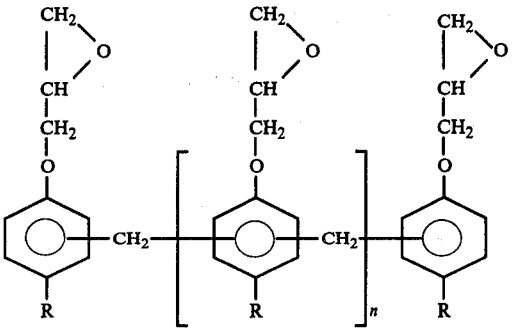

wherein R is hydrogen or an alkyl group of $C_1$ to $C_4$ and $n$ is 1 or 2;

(2) a hydantoin-type epoxy resin of the formula

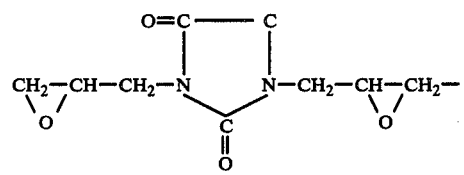

(3) an alicyclic epoxy resin of the formula

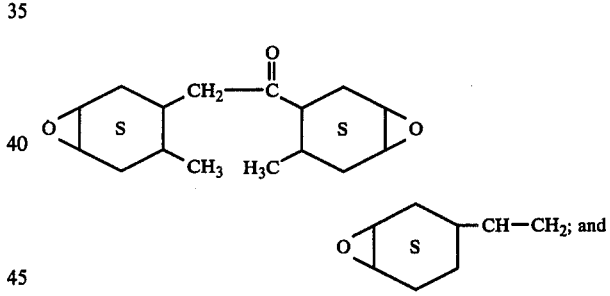

(4) an epoxidized oil of the formula

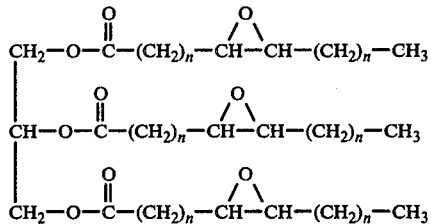

wherein $n$ is 1 to 5.

3. The method of claim 1 wherein said epoxy resin consisting of a cross-linking agent further consists of from 1 to 50 parts by weight based on 100 parts by weight of bisphenol A diglycidyl ether of at least one epoxy resin selected from the group consisting of:

(1) a novolak-type epoxy resin of the formula

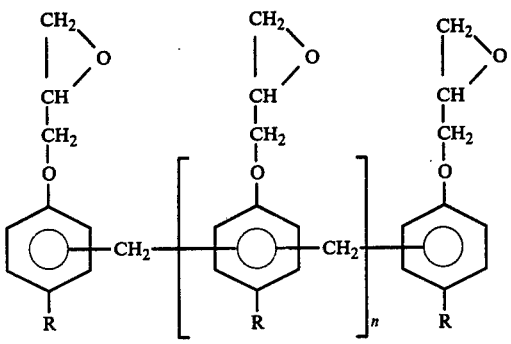

wherein R is hydrogen or an alkyl group of $C_1$ to $C_4$ and $n$ is 1 or 2;

(2) a hydantoin-type epoxy resin of the formula

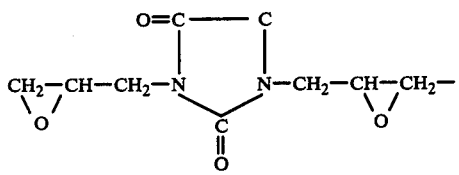

(3) an alicyclic epoxy resin of the formula

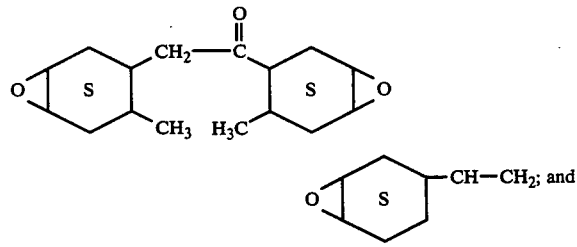

(4) an epoxidized oil of the formula

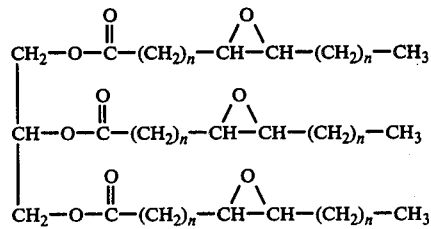

wherein $n$ is 1 to 5.

4. The method of claim 1 wherein the cross linking agent is added to said epoxy resin in an amount of 0.5 to 90 parts by weight based on 100 parts by weight of epoxy resin.

5. The method of claim 1 wherein said acid anhydride is selected from the group consisting of pyromellitic dianhydride, cyclopentanetetracarboxylic dianhydride, benzophenonetetracarboxylic dianhydride and ethylene glycol bistrimellitate and mixtures thereof.

6. The method of claim 1 for forming an insulated electromagnetic coil which comprises:
 (a) forming an electromagnetic coil by winding a self-bonding wire comprising a bonding layer of said epoxy resin having a melting point higher than 60° C. on a covered wire;
 (b) coating said electromagnetic coil with a composition consisting of a powdered epoxy resin and a cross-linking agent consisting of an acid anhydride; and
 (c) heating said coated electromagnetic coil at a temperature of 150°–250° C. whereby the epoxy resin containing the cross-linking agent is cross-linked and bridges the coil.

7. The method of claim 6 wherein the cross-linking agent is added to said epoxy resin in an amount of 0.5 to 90 parts by weight based on 100 parts by weight of epoxy resin, said cross-linking agent consisting of an acid anhydride.

8. The method of claim 6 wherein said acid anhydride is selected from the group consisting of pyromellitic dianhydride, cyclopentanetetracarboxylic dianhydride, benzophenonetetracarboxylic dianhydride and ethylene glycol bistrimellitate and mixtures thereof.

9. An electromagnetic coil fabricated by the method of claim 6.

10. The method of claim 1 for forming an insulated electromagnetic coil which comprises:
 (a) forming an electromagnetic coil from covered wire;
 (b) coating said electromagnetic coil with a bonding layer of said epoxy resin having a melting point higher than 60° C.;
 (c) coating said coil coated in step (b) with a composition consisting of a powdered epoxy resin and a cross-linking agent consisting of acid anhydrides; and
 (d) heating said coated coil of step (c) at a temperature of 150° to 250° C. whereby the epoxy resin is cross-linked and bridges the coil.

11. The method of insulating electromagnetic coils of claim 10 wherein a cross-linking agent is added to said epoxy resin in an amount of 0.5 to 90 parts by weight based on 100 parts by weight of epoxy resin, said cross-linking agent consisting of an acid anhydride.

12. The method of insulating electromagnetic coils according to claim 10 wherein said acid anhydride is selected from the group consisting of pyromellitic dianhydride, cyclopentanetetracarboxylic dianhydride, benzophenonetetracarboxylic dianhydride, ethylene glycol bistrimellitate and mixtures thereof.

13. The electromagnetic coil prepared by the method of claim 10.

* * * * *

UNITED STATES PATENT OFFICE
CERTIFICATE OF CORRECTION

Patent No. 4,127,695     Dated November 28, 1978

Inventor(s) Koichi Hirakawa, et al

It is certified that error appears in the above-identified patent and that said Letters Patent are hereby corrected as shown below:

In column 2, the formula, first line:

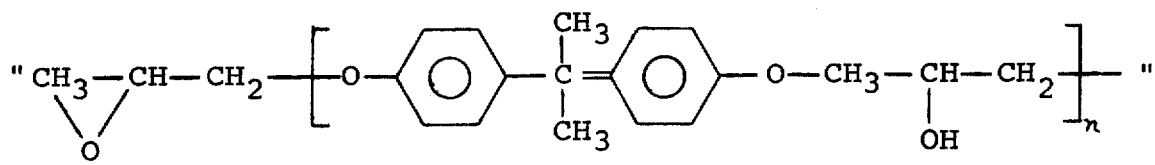

should be

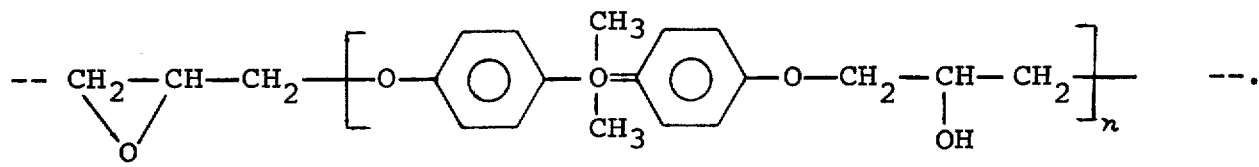

In column 3, line 35:  "CH — CH₃"  should be

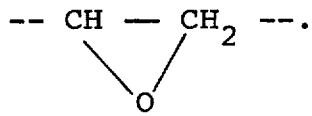

UNITED STATES PATENT OFFICE
CERTIFICATE OF CORRECTION

Patent No. 4,127,695          Dated November 28, 1978

Inventor(s) Koichi Hirakawa, et al

It is certified that error appears in the above-identified patent and that said Letters Patent are hereby corrected as shown below:

In column 4, line 32: "cycropentanetetracarboxylic" should be --cyclopentanetetracarboxylic--.

In column 5, line 59: "intented" should be --intended--.

In column 10, line 57: "10" should be --1--.

Signed and Sealed this

Twenty-ninth Day of May 1979

[SEAL]

Attest:

RUTH C. MASON
Attesting Officer

DONALD W. BANNER
Commissioner of Patents and Trademarks